R. A. DUNCAN.
CONTROL MECHANISM FOR PREVENTING EXCESSIVE SPEED OF MOTOR VEHICLES.
APPLICATION FILED DEC. 28, 1915.

1,250,290. Patented Dec. 18, 1917.

Inventor
R. A. Duncan
by
Atty.

UNITED STATES PATENT OFFICE.

RICHARD ALEXANDER DUNCAN, OF ADELAIDE, SOUTH AUSTRALIA, AUSTRALIA.

CONTROL MECHANISM FOR PREVENTING EXCESSIVE SPEED OF MOTOR-VEHICLES.

1,250,290. Specification of Letters Patent. Patented Dec. 18, 1917.

Application filed December 28, 1915. Serial No. 69,015.

*To all whom it may concern:*

Be it known that I, RICHARD ALEXANDER DUNCAN, citizen of the Commonwealth of Australia, residing at 46 Franklin street, Adelaide, in the State of South Australia, Commonwealth of Australia, have invented certain new and useful Improvements in Control Mechanism for Preventing Excessive Speed of Motor-Vehicles, of which the following is a specification.

My invention relates to control mechanism for preventing excessive speed of motor vehicles, the object of the same being to provide means whereby with the aid of specially designed mechanism the short circuiting of the electric current can be automatically effected so that the magneto becomes inoperative as soon as the vehicle exceeds a pre-determined speed.

It is a recognized fact that the cost of upkeep depends largely on the speed at which the automobile is driven. The greater the speed the greater the cost of running. This applies more particularly to automobiles which are equipped with solid tires instead of pneumatic tires, such as on motor lorries and motor trucks.

My invention aims at preventing undue speed of automobiles by means of short circuiting or switching off the magneto or other source of supply of current to the engine by an automatic apparatus, and provides apparatus whereby this may be accomplished. It can be applied to all petrol driven vehicles which utilize electric ignition in their engines.

The underlying principle of the invention consists in the application and use of a mechanical governor mounted upon a shaft which is operated from some part of the automobile which always revolves at a speed relative to the traverse of the road wheels, and by its action disengages an element whereby short circuiting takes place and prevents the transmission of electric current to the sparking mechanism. The shaft may be driven by any mechanical means such as a chain and sprockets, or a spur bevel or worm gearing, or by belt connections, and may be operated from the road wheel itself, or from the propeller shaft or the jack shaft or the axle.

In order that my invention may be the better understood I will now proceed to describe the same by aid of the accompanying illustrative drawings wherein:—

Figure 1:
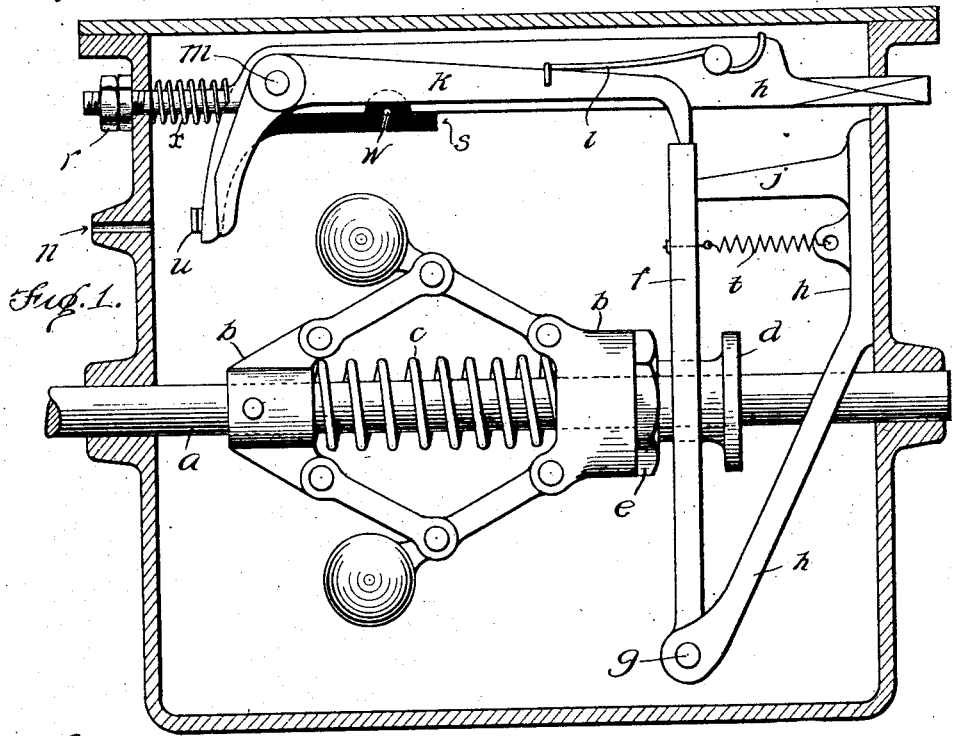
Figure 2:
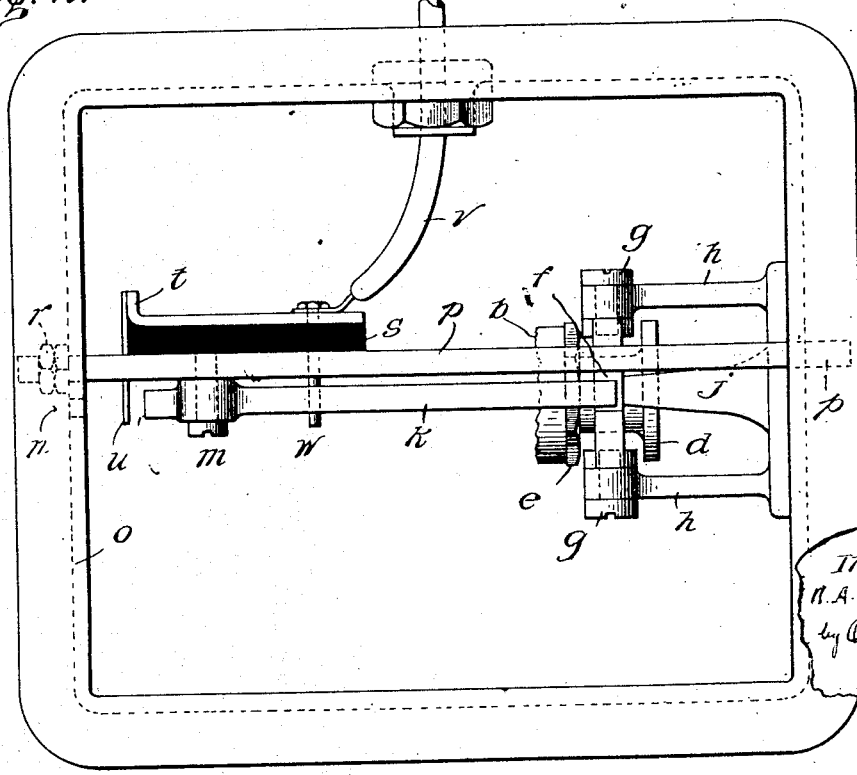

Figure 1 is a sectional elevation of the casing containing the governor and operating mechanism, Fig. 2 is a plan view of Fig. 1.

In each of the illustrations similar letters of reference are used to denote similar or corresponding parts wherever they occur.

In the drawings *a* is a shaft mounted upon suitable bearings, as for instance, bearings arranged within or as a part of a dustproof protecting covering. This shaft is driven by any convenient means from the operative part of the mechanism, and is furnished with a centrifugal governor such as *b*, one end of which is secured to the shaft in any well known manner, while the opposite end is free to slide laterally along the shaft at a position which is variable according to the throw of the governor, subject however to the influence of a controlling spring such as *c*.

The governor terminates in an adjustable screw threaded sleeve *d* having a projection or flange thereon as shown, and capable of being secured or set in a predetermined position and locked by a check nut *e* as will be well understood.

I do not confine myself to the details of the construction of the governor illustrated in the drawings.

An arm or forked element is shown at *f*, and through the forked portion or its equivalent the sleeve portion *d* of the governor is free to rotate. One end of the arm *f* is hinged at *g* on any suitably designed bracket *h*, and by means of a spring *i* is held in contact against the stop *j*.

An independently pivoted short circuiting lever or arm *k* is fulcrumed at *m*, and the end of the arm which is preferably turned substantially at a right angle to the plane of the arm *k* is so arranged that it rests upon the upper end of the arm *f*, and is pressed thereon by the spring *l*.

The opposite end of the arm *k*, which is also turned substantially at a right angle to the plane of said arm is in alinement with an opening *n* arranged in the casing *o*. The arm *k* is mounted upon the adjustment shaft *p*, which is capable of being adjusted laterally, and is held in the desired position by suitably disposed nuts *r*, and upon this shaft an insulating block *s* (Fig. 2) is also mounted, and serves the purpose of insulating the plate *t* (Fig. 2) from the adjustment shaft *p*. To the plate *t* a metallic spring *u* is attached. The shaft *p* is preferably provided with reduced ends which project through opposite walls of the dustproof casing, the forward reduced end of the shaft being threaded to receive the nuts *r* outside of the casing wall. Encircling the forward reduced end of the shaft, between the body of the latter and the adjacent wall of the casing, is an extension spring *x* which tends normally to draw the nuts *r* tightly against the outside face of the casing, and thus prevent longitudinal movement of the shaft *p* after adjustment thereof.

In Fig. 2 I have shown an insulated wire at *v*, which is attached in electrical contact with the insulated plate *t* by means of a pin *w*. This pin *w* does not make contact with the adjustment shaft *p* as will be clearly seen on reference to Fig. 1, but projects so that the arm *k* will come into electrical contact with it if not held in position by the arm *f* as shown in Fig. 1.

The other end of the insulated wire *v* is connected to the magneto or other source of electrical supply which supplies current to the engine.

When the automobile is in motion the flanged sleeve *d* will approach the arm *f*, and as the speed increases will finally come into contact with it, and will increase its traverse, carrying the arm with it until finally it passes beyond the end of the pivoted arm *k*, and thus allows the spring *l* to press the arm *k* on to the pin *w*. The insulated wire *v* is connected to the magneto in such a way that upon contact being made between the pin *w* and the arm *k* the magneto is short circuited, thus cutting off the current from the spark plug and causing the engine to cease running.

It will be understood that by means of the adjustment portions illustrated in the drawings the various parts can be accurately set to bring about the stoppage of the engine as soon as a pre-determined speed has been exceeded.

To reset the appliance a small rod (not shown in the drawings) is used to push through the opening *n* in the case. This rod presses against the spring *u*, which in turn presses against the end of the arm *k*, thus raising the opposite end of the arm *k* clear of the portion *f*. When the arm *k* is raised, as just described, the short circuit established between it and the pin *w* is broken, and the arm *k* is reset by the spring *i* drawing the arm *f* rearwardly against the stop *j* whereupon the rear bent end of arm *k* comes to rest upon the upper end of arm *f*.

In this position of the parts the engine may be restarted.

For purposes of adjustment to enable the apparatus to operate at any given speed the adjustment shaft *p* may be moved backward or forward, and can be locked by the nuts *r*, or if so desired the flange of the sleeve *d* may be adjusted independently of the shaft *p*, or may form a combined adjustment therewith.

If the shaft *p* be moved forward to the left in the dustproof casing, the rear end of the arm *k* will be moved forward in relation to the upper face of the arm *f*, and the latter will be capable of a greater length of pivotal movement or stroke before being moved out of engagement with such rear end of the arm *k* by the governor *b*; while if the shaft *p* be moved backward, the reverse will be the case. By adjusting the sleeve *d* backward or forward in the end of the governor *b*, the point in the operation of the governor *b* at which the flange of *d* will engage the arm *f* will be correspondingly varied, so that in this way the stoppage of the engine may be effected at any predetermined engine speed, within given limits.

It is desirable that after a proper adjustment has been made the device should be sealed by any convenient means to prevent the parts being tampered with.

The spring *u* is in electrical contact with the insulated plate *t* and the insulated wire *v*, and this fact prevents a rod being left in place to avoid the operation of the device, and will prevent the driver or any other person from making the apparatus inoperative, as the spring *u* must be out of contact with the arm *k* before the engine can be started.

As stated above, the wire *v* is so connected to the magnets that when the pin *w* and the arm *k* are in contact, the magneto is short circuited and naturally the same is true when the spring *u* and arm *k* are in contact. Hence, it follows that if the rod be not withdrawn, the short circuit of the magnets will continue, and the engine will remain inoperative until the rod is withdrawn.

The general action of my invention may be briefly summarized as follows:—

The shaft *a* being driven at a speed relative to the road wheels, an increase of speed of the automobile will cause the shaft *a* to revolve at a correspondingly higher rate; consequently the centrifugal governor will cause the flanged sleeve *d* to traverse toward *b* and compress the control spring, and ultimately to force the part *f* out of position so that it no longer supports the arm *k*, and consequently the arm *k* falls upon the pin *w* and short circuits the magneto.

I claim—

1. In a mechanism for controlling the speed of motor vehicles, the combination of a member rotating at speed relative to the speed of the motor, a centrifugal governor driven by said member, a pivoted arm under control of said governor, a second pivoted arm having a portion thereof normally engaging the first mentioned arm, and means for cutting off the electric current from the spark plugs of the motor when engagement between said arms is broken.

2. In a mechanism for controlling the speed of motor vehicles, the combination of a member rotating at a speed relative to the speed of the motor, a centrifugal governor driven by said member, a vertically projecting pivoted arm adapted to be moved about its pivot by the action in one direction of said governor, a horizontally projecting pivoted arm having a portion thereof normally engaging the vertical arm, and means for cutting off the electric current from the spark plugs of the motor when engagement between said arms is broken.

3. In a mechanism for controlling the speed of motor vehicles, the combination of a shaft driven from the motor, a centrifugal governor carried by said shaft, a flanged sleeve adjustable in said governor, a pivoted arm adapted to be engaged and moved by said flanged sleeve, a second pivoted arm having a portion thereof normally engaging the first mentioned arm, and means for cutting off the electric current from the spark plugs of the motor when movement of said flange sleeve breaks the engagement between said pivoted arm.

4. In a mechanism for controlling the speed of motor vehicles, the combination of a shaft driven from the motor, a centrifugal governor carried by said shaft, a pivoted arm adapted to be moved about its pivot by said governor, a second shaft longitudinally adjustable and extending parallel to said first shaft, a second arm pivotally mounted on said second shaft and having a portion thereof normally engaging the first arm, and means for cutting off the electric current from the spark plugs of the motor when engagement between said arms is broken.

5. In a mechanism for controlling the speed of motor vehicles, the combination of a shaft driven from the motor, a centrifugal governor carried by said shaft, a pivoted arm adapted to be moved about its pivot by said governor, a second shaft, longitudinally adjustable and extending parallel to said first shaft, a second arm of conductive material pivotally mounted in said second shaft and having a bent end normally engaging one end of the first arm, and means in the path of the second arm for establishing electric connection with the dynamo of the motor, whereby when engagement between said arms is broken said second arm will contact with said means and cut off the electric current from the spark plugs of the motor.

6. In a mechanism for controlling the speed of motor vehicles, the combination of a casing having an aperture therein, a shaft bearing in said casing and driven from the motor, a centrifugal governor carried by said shaft, a pair of pivotally mounted arms normally in engagement with each other, one of said arms being under control of said governor, means for cutting off the electric current from the spark plugs of the motor when engagement between said arms is broken, and a spring in line with said aperture and adapted to be engaged by a suitable tool passed through said opening to move said arms into engagement with each other.

7. In a mechanism for controlling the speed of motor vehicles, the combination of a casing having an opening therein, a shaft bearing in said casing and driven from the motor, a centrifugal governor in said shaft, a pair of pivotally mounted arms in said casing normally in engagement with each other, one of said arms having a heel in line with the opening in the casing; a longitudinally adjustable shaft on which said last named arm is carried, an insulated plate on said last named shaft in contact with the magneto circuit of the motor, and a spring on said plate interposed between said heel and the opening in the casing.

In testimony whereof I have affixed my signature in presence of two witnesses.

RICHARD ALEXANDER DUNCAN.

Witnesses:
  JOHN HUBERT COOKE,
  JOHN MITCHELL SINCLAIR.

Copies of this patent may be obtained for five cents each, by addressing the "Commissioner of Patents, Washington, D. C."